Oct. 31, 1961     E. F. SHELLEY ET AL     3,007,097

AUTOMATIC HANDLING AND ASSEMBLY SERVOSYSTEM

Filed July 2, 1959     10 Sheets–Sheet 1

FIG. 1

INVENTORS
Edwin F. Shelley
George A. Jonas
Sidney Weiser
BY
ATTORNEYS

INVENTORS
Edwin F. Shelley
George A. Jonas
Sidney Weiser

United States Patent Office 3,007,097
Patented Oct. 31, 1961

3,007,097
AUTOMATIC HANDLING AND ASSEMBLY SERVOSYSTEM
Edwin F. Shelley, New Rochelle, N.Y., and George A. Jonas, Bethesda, and Sidney Weiser, Silver Spring, Md., assignors to U. S. Industries, Inc., New York, N.Y., a corporation of Delaware
Filed July 2, 1959, Ser. No. 824,611
11 Claims. (Cl. 318—162)

This invention relates to the automatic control of apparatus and more particularly of apparatus which may be programmed in advance to effect the transfer of articles from one position to another repetitively, at the same time to perform certain manipulative operations, for example, assembling, throughout preselected motion and time cycles.

Most modern automated equipment is highly sepecialized, requiring generally a substantial initial capital investment which makes it economically practicable only where large production runs in the manufacture of a given product are required. Where production quantities are more limited and where variations in production product are numerous, or where substantial capital investment for automation cannot be justified because of possible product obsolescence, etc., industry has continued to use unskilled or semi-skilled labor for performing relatively simple tasks.

A principal object of this invention is to provide a flexible automatically controlled machine which can be readily programmed to perform repetitive tasks normally performed manually by an unskilled or semi-skilled operator such as those involved in assembly, gaging, packaging, material handling, etc.

Another object of this invention is to provide a unique position control servo-system which operates in a system defined by cylindrical co-ordinates.

A further object of this invention is to provide a unique precision positioning servo-system which employs electro-mechanical error detection means for coarse positioning of the machine work head and wave-actuated error detection means for final precision positioning of the work head with respect to a work station.

Still another object of this invention is to provide a unique automatic sequential program readout system which is controlled by a position and velocity error detector.

The invention provides a mechanical arm which supports a work head or turret with the arm being post supported in turn by a work table or base. The arm is adjustable about its post support with respect to the work table in three degrees of motion, namely, height (H), arm length or radius (R), and azimuth angle ($\theta$). Each of the three arm motions is produced and controlled by electrical servo-amplifiers (closed-loop feedback systems) which couple electric drive-motors to appropriate gear or pulley trains through forward-drive or reverse-drive magnetic clutches.

Potentiometers are used as the coarse position signal transducers in separate follow-up systems for each motion (i.e. H, R and $\theta$) while electro-optical signal transducers functioning in separate feedback loops in the R and $\theta$ servo-amplifiers, are employed to provide fine positioning control.

The arm may be programmed to assume any given position in a system of cylindrical co-ordinates by preselecting and presetting the respective command potentiometers to the appropriate positions for the three follow-up servo-systems. Fine positioning of the electro-optical transducer is effected by disposing a single light source or mirror at the desired work position so that the co-operating photo-cell transducers mounted on the work head or turret will command the follow-up servo-system to locate the work head immediately above the preselected position.

The arm may be programmed to move to any number of predetermined positions by providing the required number of pre-set potentiometers for each desired position and switching each group in sequence or in concert into the appropriate servo-amplifiers. The fine-positioning optical transducers need not be switched into the R and $\theta$ servo-amplifiers since they automatically override the coarse-position potentiometer error signal once the arm is proximately disposed by the coarse position follow-up system.

The work head or turret, mounted at the end of the mechanical arm, supports a plurality of work jaws having fingers which are electrically actuated to grasp, hold, turn or release articles at any given work position.

A direction sensitive binary-switch control system is provided to program the multi-jaw work turret. This digital system positions any one of a plurality of work jaws on the turret with respect to the supporting mechanical arm in accordance with a pre-set program order switch. On switch command a new work jaw is rotated into work position traveling from the previous sedentary position through the shorter path of rotation.

The work-jaw fingers mounted on the work turret are electrically actuated and may be programmed to grasp or release by successive pre-set switches located on a program panel.

Other objects and various further features of novelty and invention will be pointed out in the drawings and the following specification.

Figure 1:
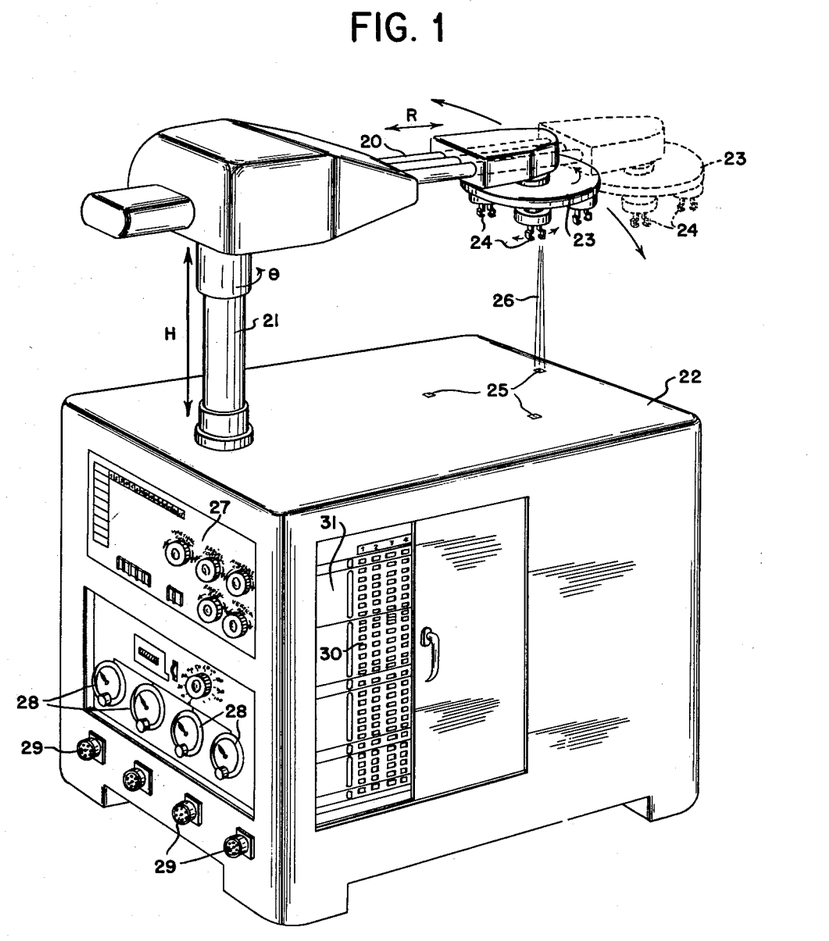
FIG. 1 is a perspective view of an automatic assembly machine embodying the features of the present invention.

Referring to FIG. 1, there is shown a mechanical arm 20 mounted on a rotatable supporting post 21. Work table 22 supports the mechanical arm and in addition houses an electrical control system. The mechanical arm is adapted to operate within a cylindrical co-ordinate system being adjustable in radial length R, in height H and in azimuth angle $\theta$. Positioning of the arm within the cylindrical co-ordinate system is effected automatically by programmed electrical servo-motor systems.

A rotatable turret work-head 23 is mounted at one end of the mechanical arm and a plurality of work jaws 24 are supported by the turret. The jaws may be automatically opened by an electrical actuator on a programmed basis when the arm and preselected set of jaws is positioned above the work assignment. Selection of a particular set of work jaws is effected by an electrical binary-code control system. Although the turret head is shown as rotatable in the horizontal plane about a vertical axis normal to the supporting arm, clearly this turret could be oriented to operate equally well about any other axis. For example the turret could be mounted in the vertical plane and rotated about the longitudinal axis of the supporting arm.

Potentiometers are employed in the electrical servo-systems to provide coarse positioning of the arm in R, $\theta$ and H co-ordinates whereas electro-optical fine positioning information is provided for at least the R and $\theta$ co-ordinates by a special light source and mirror combination working in conjunction with a plurality of photo-cells. Small mirrors 25 are located on the work table at the desired work stations. These mirrors serve to reflect a portion of light beam 26 upwardly to the turret head where photo-cells detect the edges of the beam and accordingly develop fine-position signals for the respective electrical servo-systems.

A program set-up panel 27 is provided as shown in FIG. 1. Controls for presetting the position-control potentiometers are mounted on this panel. These are normally adjusted by the factory methods engineer to accommodate the various work positions required for any given production assignment. Timer switches 28 and extenal connectors 29 are provided to permit transmission or reception of synchronizing control signals to or from co-operating external apparatus such as welding machines, punch presses, etc.

Program selector switches 30 are mounted on the program control panel 31. These switches are arranged in an ordered array and permit the storage of work program information which is supplied sequentially on command to the servo-control system program reading switches to effect completely automatic operation of the machine.

Figures 2, 3:
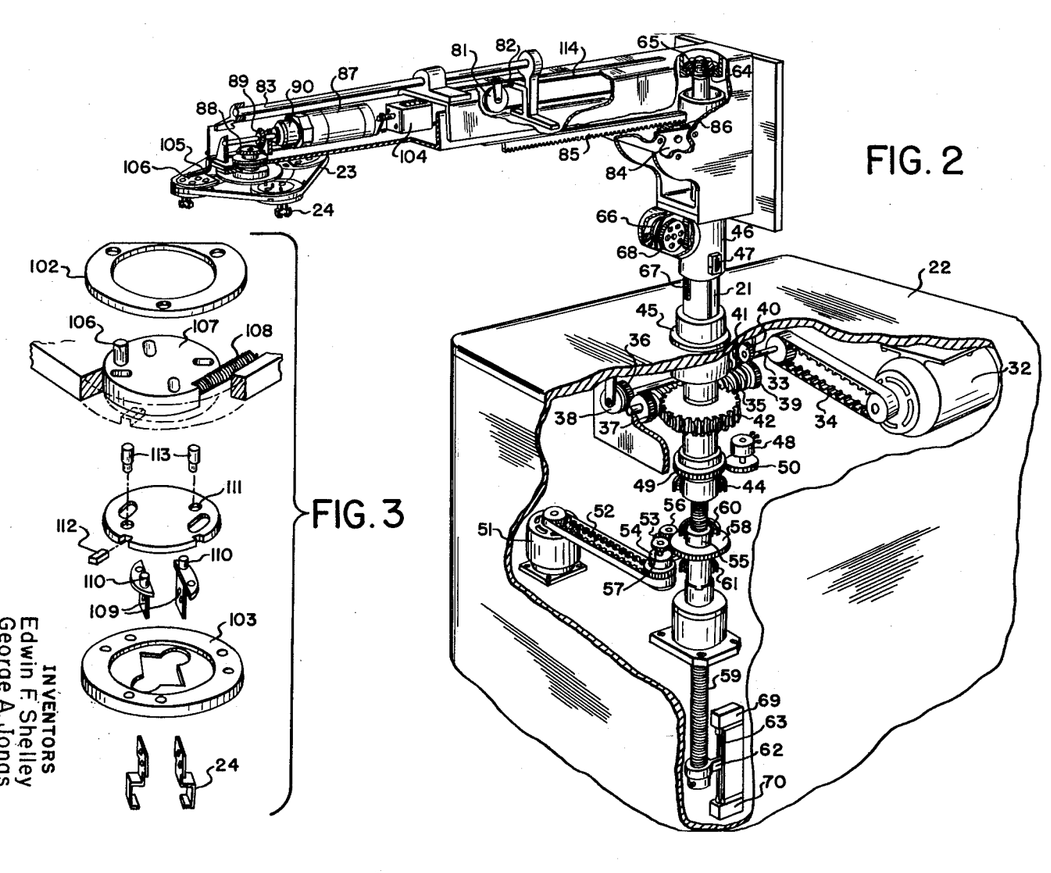
FIG. 2 is a fragmentary perspective view, with parts broken away, showing several mechanical drive features of the invention.
FIG. 3 is an enlarged fragmentary view showing the disassembled operating parts of a work jaw.

The fragmentary drawing in FIG. 2 shows various electro-mechanical driving and control features of the invention. Power for the angular rotation ($\theta$) of the work arm is provided by motor 32 and transmitted to shaft 33 by the timing belt 34. The shaft is coupled to one end of worm 35 through gears 36, 37 and magnetic clutch 38 and to the other end of the worm through gear 39, reverse drive gear 40 and magnetic clutch 41. The magnetic clutches are energized by a balanced servo-amplifier which will be described more fully hereinafter. The worm and worm wheel combination 35, 42 effects rotation of the main outer post 21 which is supported in the work table 22 by bearings 44, 45. The main outer shaft is keyed to the arm support sleeve 46 by ball race 47. This special keying design permits angular rotation of the sleeve and arm by the shaft at the same time permitting the sleeve to move vertically with respect to the shaft for arm height adjustment.

Coarse position control information for the $\theta$ servo-amplifier is provided by potentiometer 48 which is mechanically coupled to the main shaft by gears 49, 50.

Power for height adjustment of the arm is provided by motor 51 and is transmitted by timing belt 52 through reverse drive magnetic-clutch 53 and forward drive magnetic-clutch 54 through gears 56, 57, 58 to nut 55. When the clutches are energized unequally by the "H" balanced servo-amplifier, the nut is reversibly rotated causing the lead screw 59 and the arm to move vertically up or down as required. The nut is supported by the table base with bearings 60, 61. Rotation of lead-screw 59 is precluded by tongue 62 engaged in track 63. The vertical lead screw is coupled to the main arm by bearing 64 the inner race of which is secured to the lead screw by nut 65. Use of the bearing to couple the lead-screw to the arm permits the arm to rotate freely in azimuth ($\theta$) with respect to the lead-screw while providing rigid locking therebetween for height adjustment.

Coarse position control information for the H drive servo-amplifier is provided by potentiometer 66 which is mechanically coupled to the main vertical shaft by the rack and pinion gear assembly 67, 68. Switches 69 and 70 disable the vertical drive system when contacted by tongue 62 and effectively limit the H excursion of the arm.

Figure 4:
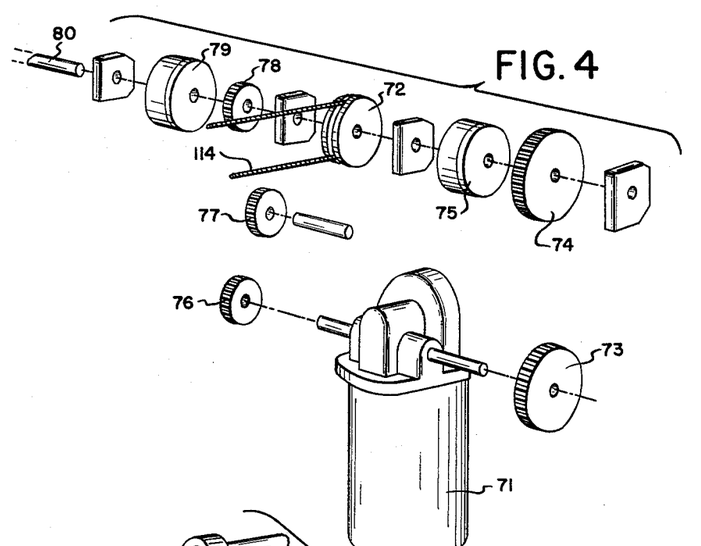
FIG. 4 is an enlarged fragmentary view showing the disassembled parts of the radial drive system.

The power drive system for controlling the radial length of the work arm is shown in FIG. 4. Power is coupled from motor 71 to drive pulley 72, mounted on shaft 80, vias gears 73, 74 and forward drive magnetic-clutch 75 and also via gears 76, 77, 78 and reverse-drive magnetic clutch 79. When the clutches are unequally energized by the balanced R servo-amplifier, pulley 81 (FIG. 2) is driven by pulley 72 and reversible linear motion is thereby imparted to the arm and turret head. The radial drive cable 114 is attached to bracket 82 which moves the work head by moving slide bar 83.

Coarse position control information for the R servo-amplifier is provided by potentiometer 84 (FIG. 2) which is coupled to the work-head by rack and pinion 85, 86 respectively.

Power for rotation of the turret 23 is provided by the reversible D.-C. motor 87 to the bevel gears 88, 89 through magnetic-clutch 90. The magnetic clutch is employed to afford "soft" mechanical coupling between the drive motor and the turret so as to lessen the probability of damage to the system in the event of jamming and also to provide greater position accuracy in turret indexing.

Figure 5:
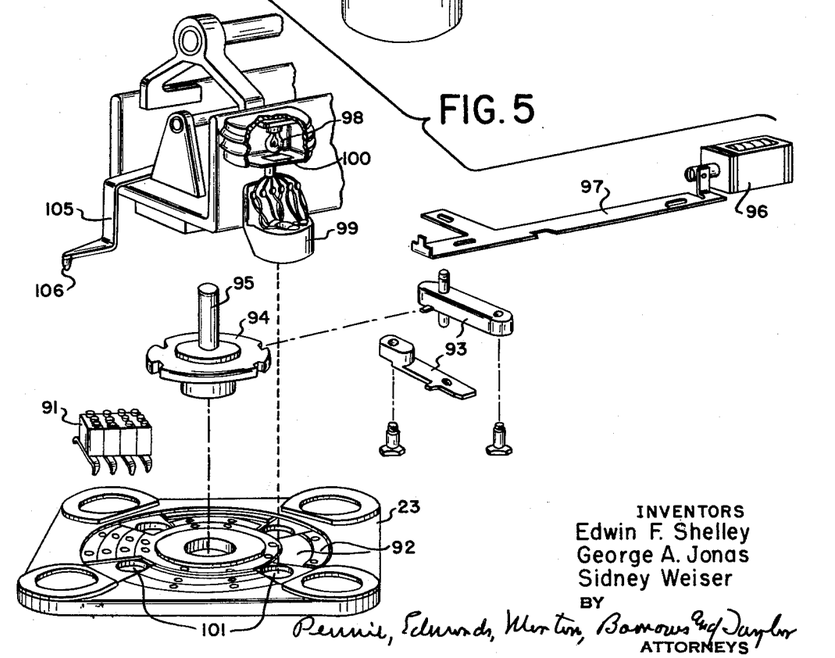
FIG. 5 is an enlarged fragmentary view showing the work turret assembly.

Turret position data is provided by binary-code microswitches 91 shown in FIG. 5. The arms of these switches ride on individual circular tracks 92 which cause the switches to open and close in different combinations depending upon which set of work jaws is rotated into the forward operate position.

Pawls 93 are provided to secure index plate 94 mounted on the turret drive shaft 95. The pawls are actuated by solenoid 96 with connecting link 97. Operation of the binary code control system, the solenoid and the drive clutch will be described more fully below in connection with FIG. 12.

Lamp 98 is mounted in a housing immediately above the turret and provides illumination for a unique electro-optical fine-positioning control system. Aperture mask 100 initially shapes the light beam to a square configuration. Four photo-cells and an optical condensing lens are mounted in the housing 99. The condensing lens projects a narrowly restricted square beam of light through hole 101 to mirror 25 mounted on table 22. Physical details of this optical system will be described more fully hereinafter in connection with FIGS. 7, 7A and 8.

Mechanical details of the work jaws or holders and their associated parts are shown in FIG. 3. The pick-up system assembly is held together in the turret by plates 102 and 103. Power to open the work-holder jaws 24 is provided by solenoid 104 through transfer link 105 acting on drive pin 106. The drive pin rotates upper disc 107 against the tension of spring 108 which serves to keep the work jaws normally closed. Pivot plates 109 are pivoted on pins 110 which are fixed in the lower disc 111. This latter disc is immovably keyed to the turret housing by detent 112. Pins 113 are rigidly secured to the pivot plates and protrude through the slots in the lower disc 111 into the slots in the upper disc 107. When the upper disc is rotated by the solenoid, the motion of the pins 113 causes the pivot plates to open. The workholder jaws, which are secured to the pivot plates by machine screws, may be either the "universal" type or a special type specifically designed for the particular job at hand. The multi-station turret provides multi-jaw action for the single arm affording the capacity to hold a plurality of parts at one time. In the specific embodiment shown in FIGS. 2 and 3 a single jaw can be actuated at one time. It will be understood that an individual solenoid actuator could be provided for each work jaw so as to make possible the simultaneous operation of all jaws at any selected work station. The solenoids are controlled by pre-set switches on the program panel which are switched into the appropriate control circuits by the program reading system which will be described in some detail hereinafter.

Figure 6:
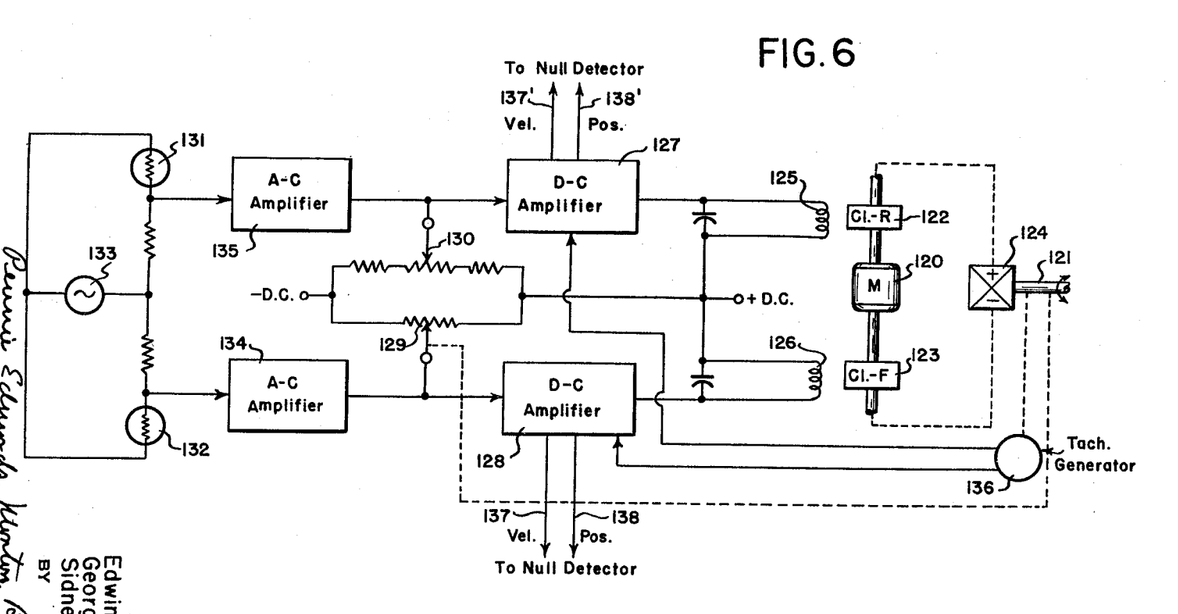
FIG. 6 is a block diagram of a balanced servo-system provided in accordance with the teachings of the invention.

A block diagram of the balanced servo-amplifier and motor drive system used to control the R and θ motions of the mechanical arm is shown in FIG. 6. Motor 120 providing the drive power is coupled to output drive shaft 121 through reverse-drive magnetic-clutch 122, forward-drive magnetic clutch 123 and differential gear train 124. Clutch coils 125 and 126 are energized by the separate outputs of the balanced D.-C. coupled amplifier 127, 128. Potentiometer 129, which is mechanically coupled to the output shaft 121, provides coarse position feedback information to the input of amplifier 128 while potentiometer 130 provides a D.-C. reference position signal to the input of amplifier 127. Any difference that exists between the voltages developed at the arms of the two potentiometers produces a corresponding proportional difference in the energization of the two magnetic clutches thereby causing the motor to drive potentiometer 129 in the appropriate direction to reduce the voltage difference (position-error) to approximately zero. Potentiometer 130 represents one of a plurality of program potentiometers which are preset to values corresponding to positions which the operator wishes the machine to automatically assume on command. These potentiometers are switched in automatically in sequence by a program stopper relay to effect the desired coarse positioning of the work arm in the R, θ and H co-ordinates.

Fine positioning information is developed by photo-sensitive cells 131 and 132 which are electrically energized by an A.-C. voltage supply 133. The voltage drops across the two photo-sensitive cells are amplified respectively by the balanced A.-C. coupled amplifier 134, 135 and in turn by the output balanced amplifier 127, 128. Each light-sensitive photo-cell effectively energizes one of the magnetic clutches. Whenever an unbalance in cell illumination occurs, a proportional unbalance in clutch energization is effected and drive motor 124 accordingly moves the arm in the appropriate direction along the R (or θ) co-ordinate to restore illumination balance. It should be noted that no requirement exists for switching from the coarse position feedback control to the fine-position control with the servo-system provided by this invention. The fine-position photo-cell control only becomes effective after the coarse positioning system has moved the work arm to a point where the photo cells are illuminated by the small reflecting mirror. Thereafter the photo-cell system, with the higher rate of feedback, overrides the coarse-position feedback signal and accurately positions the work-head immediately above the small pre-located mirror.

Although the servo-amplifier provided by this invention could be D.-C. connected throughout, amplifier and power supply drift problems are minimized by energizing the photo-cells with A.-C. and employing A.-C. coupling in the early high-gain stages. The entire amplifier may advantageously be transistorized with the input A.-C. coupled stages operated class B. Although the servo-system shown in the embodiment of FIG. 6 is of the balanced type using both A.-C. and D.-C. signals for control purposes, it will be apparent to those skilled in the art that other equivalent systems such as a single-ended phase-sensitive A.-C. servo-system, may be substituted where desired.

In addition to the proportional feedback provided by the position potentiometer and the photo-cells, velocity feedback (derivative) is provided by tachometer generator 136 to amplifier 127, 128. The velocity feedback feature improves the transient response of the servo-system by substantially eliminating "hunting" and consequently improves the general performance of the machine especially for small part assembly assignments. The velocity feedback signals and the position feedback signals are coupled to a null detector (see FIG. 9) via conductors 137, 137' and 138, 138' respectively. The null detector operates to arrest the advancement of the automatic program reading system until both of these feedback signals have reached zero value or some predetermined minimum value.

Figure 7:
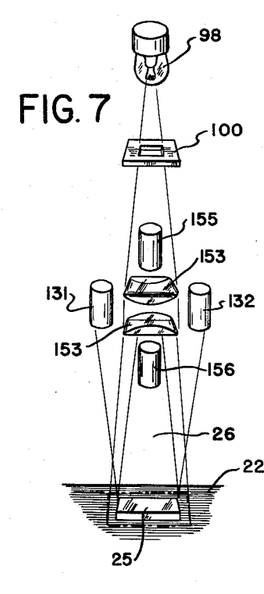
FIGS. 7, 7A and 8 are fragmentary perspective views showing various mechanical arrangements employed in the photo-sensitive fine positioning system of the invention.

Some of the optical and mechanical features of the photo-sensitive fine positioning system provided by this invention are shown in FIG. 7. In a concentric embodiment shown therein a narrowly restricted symmetrical light beam 26 is projected by a compact projector mounted above the turret on the work arm. This projector comprises light source 98, a restricting aperture 100 and condenser lenses 153. The aperture is advantageously shaped to project a square uniform beam of light. A small square mirror 25 is mounted on the work table 22 at each desired work position for the machine. This mirror is somewhat smaller in dimensions than the projected square light beam which it intercepts and partially reflects back upwardly for detection by the two pairs of photo-cells 131, 132, and 155, 156. Since the mirror is smaller in its lineal dimensions than the projected light beam, the dimensions of the reflected light beam that falls on the four photo-cells are determined by the size of restricting mirror and the arm height since the rays of the light beam are slightly divergent. Actually the photo-cells employed are sensitive to both the visible part of the light spectrum as well as the invisible part (infra-red) and as a consequence a square infra-red beam having slightly larger dimensions than the visible beam is also projected and sensed by the photo-cells.

Figure 7A:
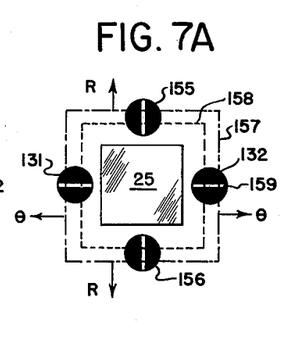

Referring to FIG. 7A the infra-red beam is shown at 157 while the visible beam is shown at 158. The four photo-cells have active areas 159 and current flow through these photo-cells varies as a function of the active area which is illuminated (assuming the beam has uniform cross-section intensity). Photo-cells 131 and 132 detect the light beam edges which move when the θ servo-system positions the arm in that co-ordinate whereas photo-cells 155 and 156 serve to detect the light beam edges which move in the indicated R direction when the R servo-system positions the arm along the R co-ordinate. Current flow through the separate θ photo-cells is amplified by the balanced θ servo-amplifier (see FIG. 6) to provide fine position control information for that co-ordinate while photo-cells 155 and 156 serve the same function for the R servo-system. Any unbalance in illumination between the respective co-operating photo-cells causes the servo-drive system to move the arm in the appropriate direction to reduce the unbalance to a nullity. Thus the coarse position feedback control system (potentiometer feedback) moves the arm carrying the light-projector and photo-cells to the approximate desired work position in the R and θ co-ordinates and thereafter the self-balancing photo-sensing system directs the respective servo-drive systems (R and θ) to center the photo-cells on the small mirror-reflected square light beam.

One of the unique features of the optical fine positioning system provided by this invention lies in the fact that the square single light beam and photo-cell configuration permits either simultaneous positioning or independent sequential positioning of the work arm in the θ and R co-ordinates. This feature accrues to the invention because of the light beam symmetry with respect to the independent pairs of photo-cells. Since the sensed light beam employed in the preferred embodiment is square, the photo-cells actually complete the final fine positioning of the work arm following a cartesian co-ordinate system.

When the work arm is programmed to operate at low heights above the work table, the useable visible light beam may fall inside the sensitive areas of the four photo-cells. Since the infra-red beam is somewhat larger than the visible beam due to its increased wavelength (greater divergence), it serves to energize the photo-cells and position the arm at the low arm heights. At increased arm heights, on the other hand, the visible beam predominantly controls since the infra-red beam edges overlap the sensitive areas of the photo-cells and thereby lose control of the system when the cells are finally centered on the visible beam. Because of the unique dual light beam concept which is employed in this invention, the system is operable over a considerable height range providing a substantially constant position control sensitivity in the R and θ co-ordinates.

Although the photo-sensitive fine positioning system described above is shown employed in only the R and θ servo-positioning systems, it will be apparent to those skilled in the art that this feature of the invention may also be used to advantage in the H servo-system.

Figure 8:
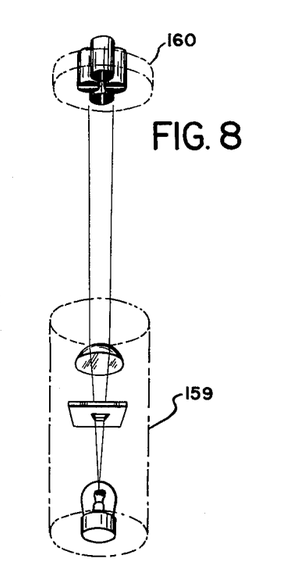

The lineal photo-sensitive homing system shown in FIG. 8 operates on the same general principles as the folded concentric system shown in FIG. 7 and described above. In this embodiment the light projector shown at 159 is mounted in a stationary position at a desired work station rather than on the movable work arm. The four photo-cells 160 are again mounted on the work arm and serve to develop fine-position error signals in the same manner as the cells described above in connection with FIG. 7.

It will be apparent to those skilled in the art that homing systems employing other forms of non-contacting or wave-actuated type sensors may be employed with equal success to produce fine-position control information. In certain instances it may be advantageous to employ a transducer and detector combination which functions over different wavelength portions of the electro-magnetic spectrum such as the non-visible ultra-violet range or the radio-frequency range. Wave actuated electrostatic or electromagnetic pick-off devices may be employed to develop fine position control information over very small distance intervals along a predetermined portion of the motion path. In certain instances the user might employ highly directional ultrasonic transducers to effectively develop the fine position information.

Figure 9:
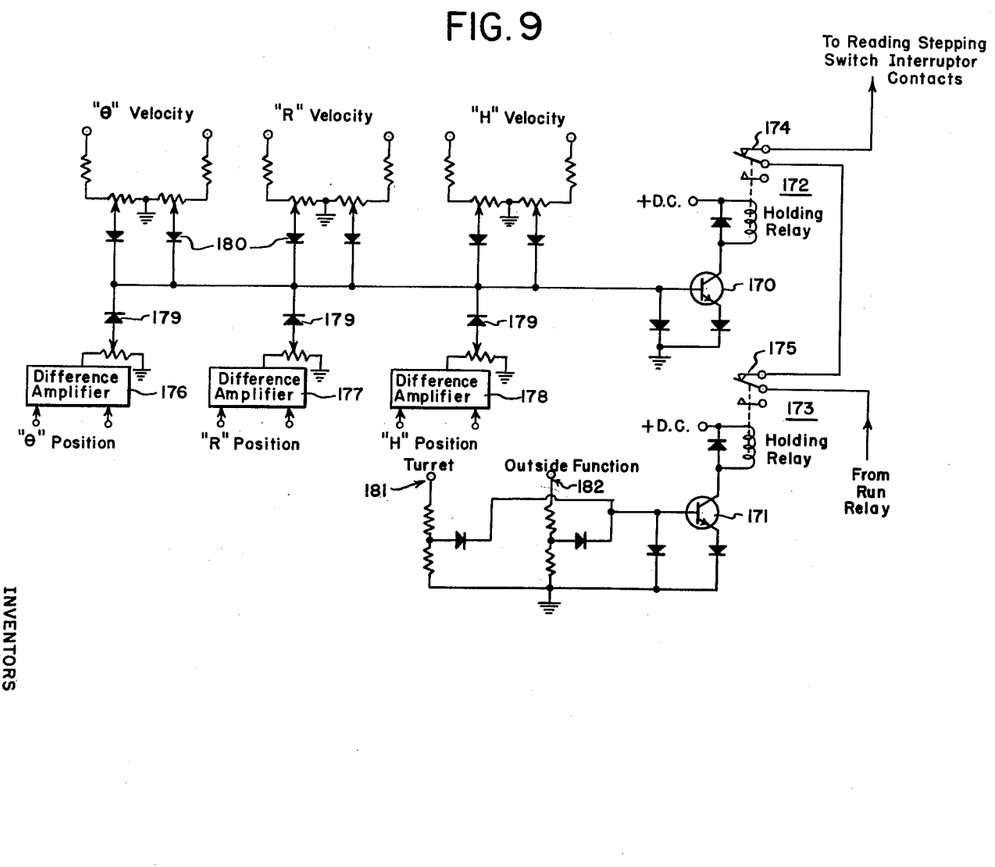
FIG. 9 is a fragmentary schematic diagram showing a position and velocity error detector operated in accordance with the invention.

Referring next to FIG. 9 there is shown therein a schematic diagram of the central null detection system which serves to monitor each programmed servo-system (in addition to an outside function) and accordingly control the advance of the automatic programming of these servo-systems. Transistors 170 and 171 are employed as control devices for the holding relays 172 and 173 respectively. Since both transistors are biased to cutoff, during the absence of input signals both holding relays remain in an unenergized condition and the normally closed contacts 174 and 175, connected in series relationship, provide a ground return for the interruptor contacts (self stepping) of the program reading relay (see FIG. 10). When a signal is applied to the base of either transistor, that transistor will conduct sufficient current to actuate its associated holding relay and thereby arrest the advance of the self-stepping program reading relay. The only condition during which transistor 170 will not conduct is that which obtains when both the position-error and the velocity of each servo-control system (R, θ and H) are reduced to zero. Position error signals are supplied to difference amplifiers 176, 177, 178 from the θ, R and H balanced servo-amplifiers respectively. Position error signals are coupled to the base of transistor 170 via unilateral coupling diodes 179 which preclude cross-coupling between the various inputs.

Velocity error signals are supplied to the base of transistor 170 via coupling diodes 180 from the respective θ, R and H tachometer generators.

Operation of control transistor 171 by the turret hold signal connected at 181 or the outside-function hold signal connected at 182 is substantially the same as the operation of companion control transistor 170. Whenever the turret head is in the process of being positioned by the digital control system to be described below, a D.-C. hold voltage is supplied to terminal 181 which causes transistor 171 to actuate relay 173 and hold the program reading relay at the turret servo-control input until the turret drive system has correctly positioned the turret. In the same manner, an outside function hold signal may be supplied to terminal 182 by a co-operating external machine (e.g. punch press, etc.) to stop the programming operation until the external machine has completed its work function.

Figure 10:
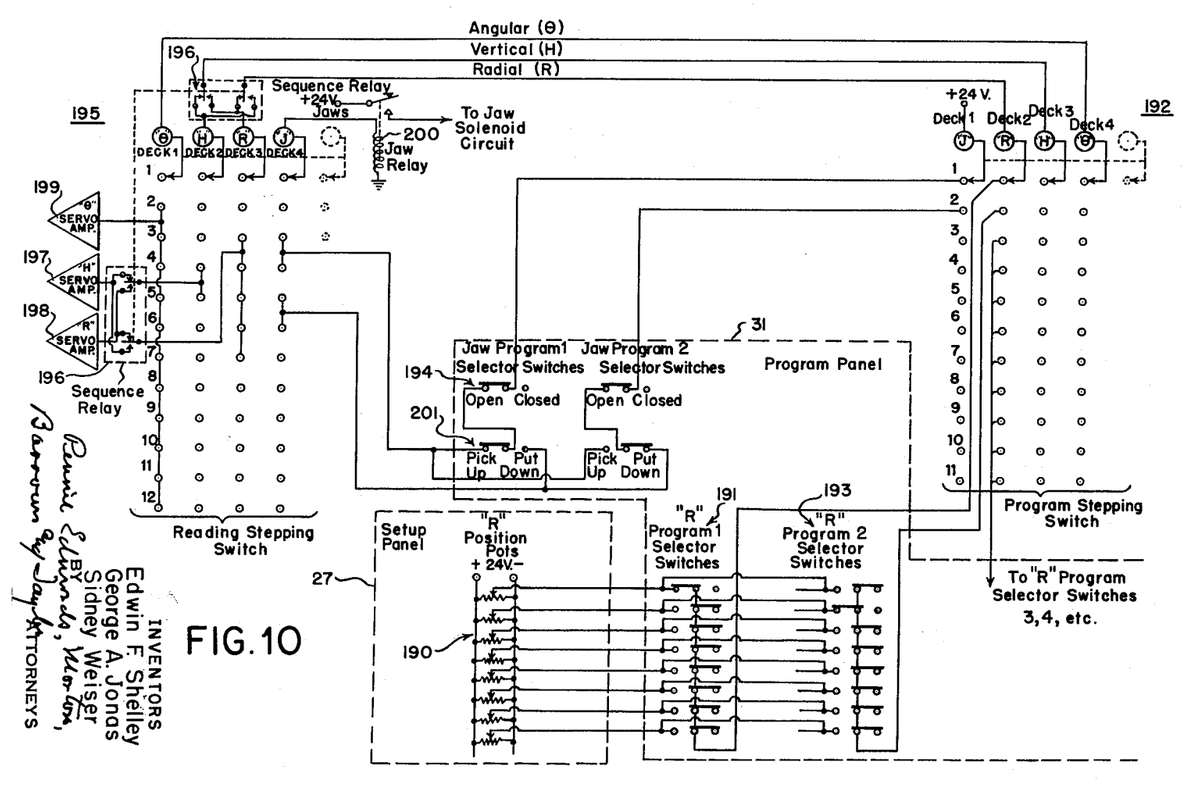
FIG. 10 is a simplified block and schematic diagram of the automatic program reading system operated in accordance with the invention.

Some of the unique and flexible circuit means provided by this invention for storing work function and work position information along with the simple and unique means provided for automatically operating the machine in accordance with and in response to this information are indicated in the fragmentary schematic drawing shown in FIG. 10. Generally speaking, two types of storage devices are employed in the program storage system of this invention namely, switches which either provide a maximum operate voltage in an "on" position or zero voltage in an "off" position, and selectable potentiometers which provide variable voltages. The R, θ and H servo-systems are programmed with potentiometers. For purposes of simplicity only R program potentiometers 190 are shown in this drawing. The arm of each potentiometer is connected to a plurality of multiple-position program selector switches 191 mounted on the program panel 31. The arm of each program selector switch is connected to an assigned terminal position on an assigned deck of a multiple deck program stepping switch 192. Thus program selector switch 191 is connected to terminal 1 on deck 2 of the program stepping switch, and selector switch 193 is connected to terminal 2 of deck 2, etc. Deck 2 is assigned solely to R program potentiometers. By virtue of the program selector switch provision, any one of the preset R position potentiometers can be connected to any one of the eleven positions shown on deck 2 of the program stepping switch. Switch decks 3 and 4, shown vacant for purposes of simplification, are connected to H and θ position potentiometers via their own respective program selector switches (not shown).

Deck 1 of the program stepping switch is assigned to store program information for controlling the work jaws. Since these jaws are normally maintained in a closed position by spring loading and are opened by actuation of a solenoid, the programming of this work function is effectively accomplished by connecting a plurality of two-position switches 194 to each of the respective terminals on deck 1 of the program stepping switch. These switches are preset, as desired, to either an "open" position or a "closed" position. Further details on the operation of this part of the programming circuit will be discussed below in connection with a description of the program reading sequence or logic.

Since the program stepper switch has all available stored program information connected to its terminals, presumably each rotor arm of this switch could be employed to read out the stored control information directly and simultaneously to its corresponding part of the control system. Such a readout system would lack in control flexibility and logic for many applications since all programmed operations would be carried out simultaneously. Thus in position 1 the entire programmed action category for jaw control, R position, H position, $\theta$ position, and turret position (not shown) would be initiated simultaneously and when completed the switch would step to position 2 and that action category would be carried out in concert, etc.

Reading stepping switch 195 is provided to operate co-operatively with the program stepping switch to enhance the flexibility of the program reading system. A separate deck on the multiple deck reading switch is assigned to each programmed function and the corresponding switch arms of the $\theta$, H and R decks are connected together as shown. The inputs to the H and R arms of the reading switch are connected thereto through a sequence relay switch 196 which functions when energized to transpose these input programs and at the same transpose the inputs to the H and R servo-amplifiers shown at 197 and 198. The purpose of this switch is to provide a simple and convenient way to alter the sequential order in which these two servo-positioning systems are programmed. It will be noted that the normal sequence for positioning the work arm etc. is established by the order in which these functions are positioned with respect to one another on the reading switch. In the embodiment shown in FIG. 10, the $\theta$ servo-amplifier 199 is programmed first (position 2), followed by the R servo-amplifier (position 3) and then the H amplifier (position 4). This sequence may be altered of course to suit the operational needs of the user. The sequence possibilities available as shown are advantageous for many assembly and transfer operations since they closely approximate the natural motions followed by the human arm and hand in handling articles. Thus the arm, operating in cylindrical co-ordinates, would be positioned to the selected $\theta$ station (azimuth angle), then the arm length R would be adjusted to the proper length and finally the height H would be adjusted. Operation of the sequence relay switch would cause the arm to move up or down first (from a selected reference position) and then inwardly or outwardly as required. The importance of this switchable sequence feature can be appreciated in job assignments where, for example, the avenue of approach to a co-operating machine or the like is particularly restricted.

Deck 4 of the reading switch is provided to program the work jaws on the turret head. The arm of this deck is connected to jaw relay 200 which in turn operates the jaw solenoid. The operating voltage for this relay is supplied from the arm of deck 1 on the program stepping switch 194. When this switch is set to the closed position the jaws remain closed for that particular action category. If the switch is set to the open position and program switch 201 is set to the pick-up position, then the jaws will be opened at the same time (position 3 on the reading switch) that the arm is being positioned radially but before it has been positioned in height. When the reader switch is advanced to position 4 to program the H servo-system, the jaws are still held open in readiness to pick up an article. At position 5 on the reader switch, whereas the R, $\theta$ and H servo-system programs remain unchanged from position 4, the jaw solenoid is now de-energized since switch 201 had been programmed to pick up instead of put down thereby breaking the 24 v. circuit to terminals 5 and 6 of deck 4. When switch 201 is programmed to "put-down," the jaws remain closed until position 5 is visited by the reader-switch at which time the jaws are opened to put down any article that had previously been picked up.

The possible combinations of program sequences which can be carried out with the program storage and reading system disclosed by this invention are limited only by the imagination of the user. In many instances the user will find it advantageous to provide fixed reference position inputs to one or more of the servo-positioning reader switch input terminals so that the work arm will return to a safe reference position between program work assignments and thereby avoid damaging part assemblies. It should be noted that the separate switch decks provided for each program function permit the choice of a strictly sequential program readout, a simultaneous readout, or partially sequential and partially simultaneous. By the same token the timing sequence that may be adopted for the return of the work arm from a finished work assignment may be widely varied.

Figure 11:
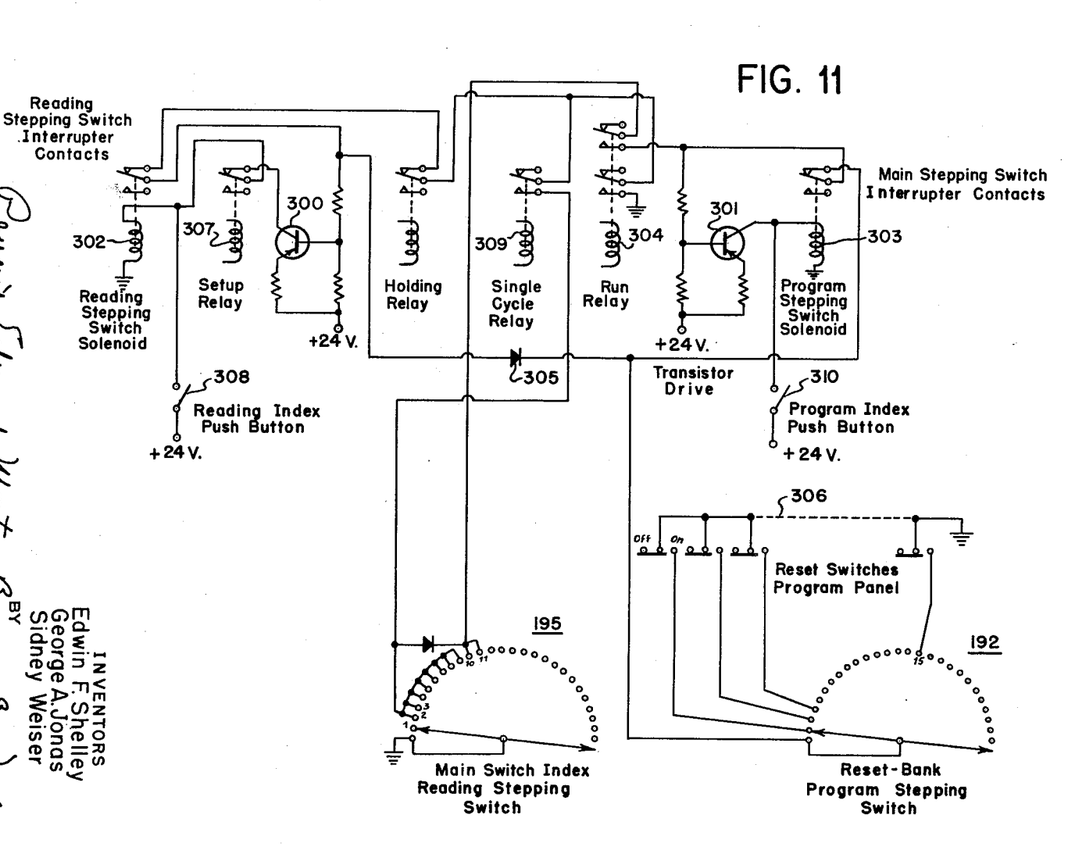
FIG. 11 is a fragmentary schematic diagram showing various features of automatic control circuits for the program switching system of this invention.

The fragmentary schematic diagram shown in FIG. 11 discloses several operating features provided by this invention for controlling the automatic program reading system referred to above. Both the reading stepping switch 195 and the program stepping switch 192 are operated as self-stepping switches, however control transistors 300 and 301 functioning as current amplifiers, are provided to energize the respective stepping switch solenoids 302, 303. The base of transistor 300 is returned to ground through the normally closed interruptor contacts of the reader stepper switch (as shown), in series with the normally closed contacts of the holding relay (see FIG. 9, 172, 173) and the normally open contacts of run relay 304. When the run relay is energized, the base ground return is completed, transistor 300 will conduct in self interrupted fashion and the reader switch will operate as a self-stepping switch. This normal self-stepping operation will be interrupted by the operation of either of the holding relays described in connection with FIG. 9.

The base of transistor 301 is normally returned to ground only when the reader switch reaches terminals 10 and 11 during the "run" operation, at which time the emitter conducts sufficient current to advance the program stepper switch to the next program category. Thus each time the reader switch moves through ten steps the program switch is advanced one position to a new program. Diode 305 prevents the reading relay from advancing beyond position 10 or 11 when the program stepper switch is being advanced by temporarily grounding the base of transistor 300 through the normally closed interruptor switch contacts of the program stepper switch and back through the ground established by contacts 10 and 11 of the reader switch. This temporary ground path holds transistor 300 in the conduction state and hence halts, momentarily, the advance of the reader relay.

Reset switches 306 are provided to enable the operator to quickly by-pass any one or more program steps on the program stepper switch. These switches when set in the "on" position provide an immediate ground return for the base of control transistor 301 via the interruptor contacts of the program switch and hence the program switch promptly steps itself onward to the next program category. In this instance, holding diode 305 grounds the base of transistor 300 through the reset bank terminals and the associated reset switches thereby momentarily halting the advance of the reader switch until the program switch has stepped to a new program category.

Set-up relay 307 is provided to convert the automatic programming system discussed above to a manual step-by-step function. When this relay is operated, its normally closed contacts in the emitter circuit of transistor 300 are opened, the run relay is de-energized and the self-stepping feature of the reading relay is disabled. Advancement of the reading switch is effected by manually operating reading index push button 308.

After a particular work category has been manually set up on a step-by-step basis, single cycle relay 309 is energized causing the base of transistor 300 to be grounded through the indexing bank on the reading switch as shown. The single cycle operation is the same as the normal "run" operation except that the automatic stepping of the reading switch is stopped after one program cycle at position 1 where the ground return for the transistor base is eliminated. At this position the reader switch may either be started through the same cycle by manually pushing the reading index switch once more, or a second program may be run through on a single cycle basis by depressing the program index button 310 which advances the program switch one step to a new program. Thus each step of a single work program may be set up on a step-by-step basis and then tested for general performance on a single cycle run. After each work program category has been set up and tested, the run-relay may be thrown to the "on" position and the program reader switch will automatically step itself, and in turn the main program stepper switch, through each and every preset work program.

Figure 12:
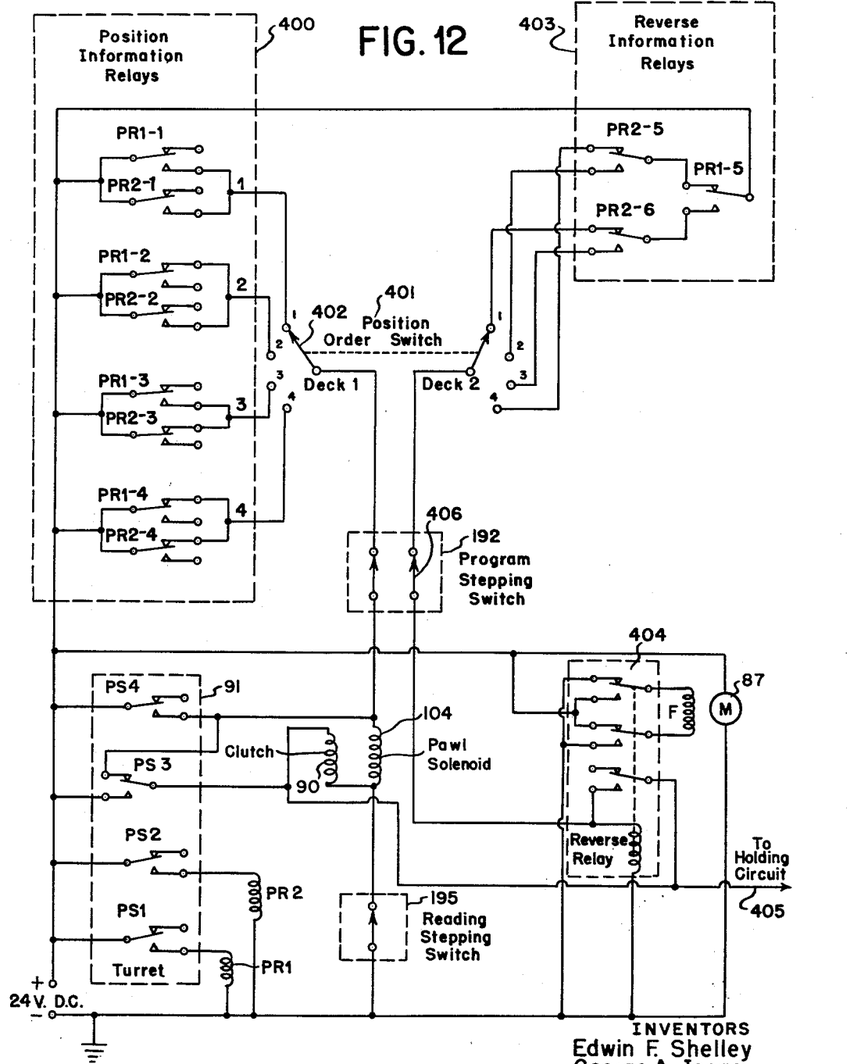
FIG. 12 is a schematic diagram showing an automatic digital control system employed to position the multi-position work turret.

A schematic diagram of the digital control system provided for positioning the turret of this invention is shown in FIG. 12. The details of this control system are disclosed in concurrently filed co-pending patent application of Sidney Weiser et al., entitled "Direction-Sensitive Binary Code Automatic Position Control System" and assigned to the assignee of the present application. This system provides bi-directional control of the work turret and in all instances the turret is rotated through the shorter of two possible paths from one assignment to the next. Reversible motor 87 provides drive power to rotate the turret to any one of four possible binary coded positions. Microswitches PS1 through PS4 shown at 91 ride on special coded tracks on the turret, and function to provide turret position information in binary code form. Switches PS1 and PS2 actuate multi-contact relays PR-1 and PR-2 which function co-operatively to convert the microswitch binary position codes (1 through 4) to decimal-number form. The first four single-pole double-throw switch contacts on each of these relays are paired together as shown at 400 to effectively translate each binary position code to its decimal number equivalent. Each translated output is connected to its corresponding numbered position on deck 1 of a plurality of program position order switches 401 (one switch shown) located on the program panel. The switch arm 402 of deck 1 is connected to an assigned switch terminal on a turret deck of the program stepping switch 192. When the reading switch 195 and the program switch 192 are both closed, the power circuit will be completed to the indexing pawl solenoid 104, and the turret magnetic clutch 90 through the normally closed contacts of microswitch PS3. Power will actually be supplied to move the turret whenever the turret is located at any other coded position than the one called for by the order switch 401. Microswitch PS3 is provided to sense positions intermediate the four coded positions. This switch is actuated by raised track segments in the intermediate positions and power is thereby promptly supplied to the drive clutch directly from the power supply whenever the turret is inadvertently moved to a non-coded intermediate position. After the turret has been moved to a coded position, the position information relays then control the clutch and solenoid in the normal manner and the turret is advanced to the correct ordered position.

The reversed information relays shown at 403 are additional single-pole double-throw switch contacts on the aforementioned PR1 and PR2 binary code translation relays. These particular relay contacts are combined to develop reverse control signals for the relay switch 404 which is provided to reverse the direction of rotation of the drive motor whenever the reverse direction would be the shorter path to the new ordered position. In the embodiment shown, having four turret positions, only one condition exists which demands a reversal in the direction of drive for each of the four positions (i.e. 4 to 3, 3 to 2, etc.). The reverse information relays effectively translate binary position code information to decimal-number information. The four decimal-number outputs from these relays are connected to deck 2 of the position order switch and the reverse relay 404 is actuated as required through a separate switch deck 406 on the program stepping switch 192.

An output holding voltage is supplied to the null detector circuit (see FIG. 9) via conductor 405 whenever the turret drive clutch or the reverse relay is energized thereby arresting the advance of the program reading switch until the turret has been properly moved to its ordered position.

Figure 13:
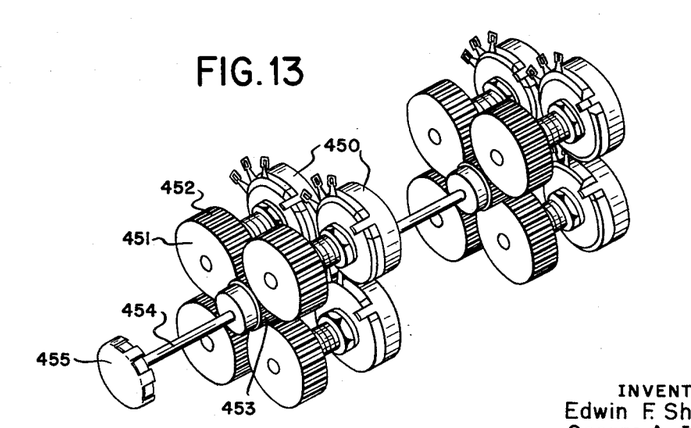
FIG. 13 is a perspective view showing a single-knob potentiometer control assembly constructed in accordance with the invention.

A unique single knob electro-mechanical control assembly is provided as a part of this invention for individually positioning each of the program potentiometers assigned to a given servo-positioning system. The mechanical features of this assembly are shown in FIG. 13 where eight potentiometers 450 are coupled through friction type magnetic clutches 451 and through gear trains 452, 453 to a central control shaft 454. When the set-up control relay is actuated (see FIG. 11) additional contacts on the program selector switch function to energize the magnetic clutch associated with the selected potentiometer. Thus the single control knob 455 is used to adjust each of the eight potentiometers, one at a time, during the initial program set-up. When the set-up relay is de-energized, none of the clutches can be energized and consequently, none of the potentiometers can be inadvertently maladjusted. The great advantage offered by this control assembly in saving of control panel space is obvious.

Figure 14:
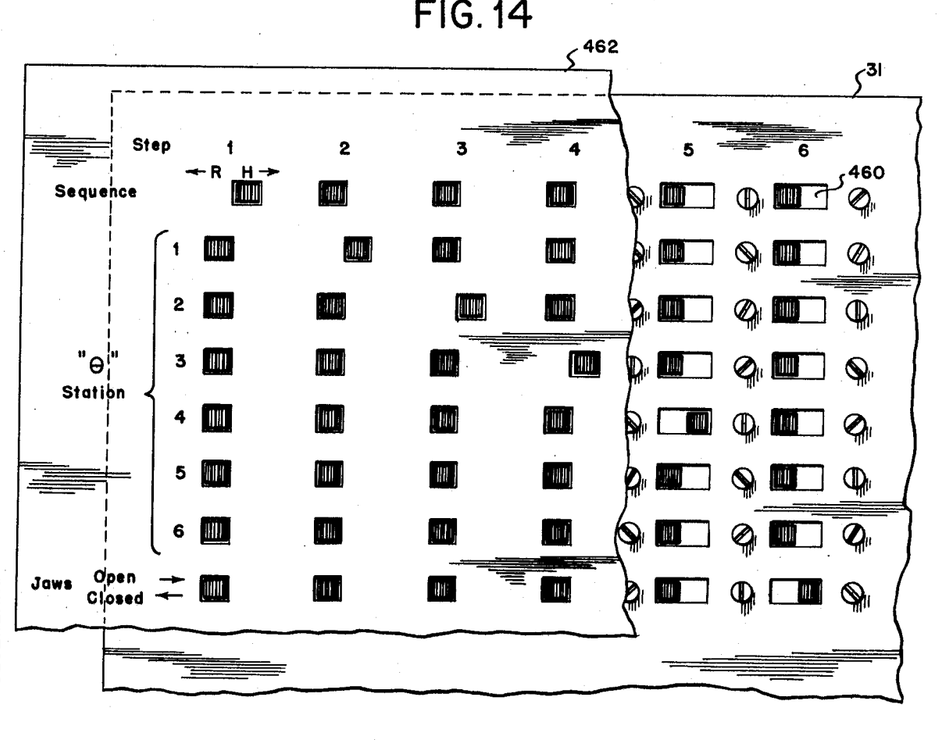
FIG. 14 is a plan view of a program switch panel and punch-card overlay constructed in accordance with one feature of the invention.

A unique program selector switch panel provided as a part of this invention is shown in the fragmentary drawing of FIG. 14. Two-position slider-type switches 460 are mounted compactly in rows and columns on program panel 31. Each vertical column of switches is assigned to a specific work program with individual switches or groups of switches being provided to program each machine function (e.g. θ, R, H, turret, jaws, etc.). In a practical operating machine the program panel might advantageously be designed to accommodate as many as 15 different work programs (15 columns of switches) with switches being provided in each column to select any one of six θ positions, eight H positions, eight R positions, four turret positions, two jaw positions, etc. In setting up a work program on this panel, a factory methods engineer would normally lay out the entire work function assignments and work position assignments on paper. Specific potentiometers would be allocated for each different work position, turret positions would be assigned and jaw operations would be determined for each individual work program. A program panel overlay card 462 would then be punched out for the entire program panel. This punch card would uniquely identify the switches in each column that are to be programmed. When the panel is properly set up in accordance with the engineers method sheet, then the punch card can be promptly dropped over the switch handles with the assurance that an entire machine work assignment has been correctly programed. When mounted on the program panel, the punch card securely locks the switches in their proper positions and secures the system against inadvertent switching errors. The punch cards are easily stored and provide valuable savings in time where job assignments are repeated.

It should be understood that the specific apparatus shown and described herein is intended to be representative only. Reference should therefore be made to the following claims in determining the full scope of the invention.

We claim:
1. In an electrical servo-motor control system for automatically positioning a controlled element, the combination which comprises, a balanced input electrical servo-amplifier, a balanced output electrical servo-amplifier, said input amplifier being connected in cascade relation with said output amplifier, a controlled element, electric motor driving means, reverse-drive and forward-drive magnetic clutches, said motor driving means being differentially coupled mechanically to said controlled element by said magnetic clutches respectively, circuit means electrically coupling the separate outputs of said output servo-amplifier to said reverse-drive and to said forward-drive magnetic clutches respectively, an electro-mechanical signal transducer adapted to provide coarse position feedback between said controlled element and one input to said output servo-amplifier, means mounted on said controlled element adapted to produce a narrowly restricted light beam of symmetrical cross section with respect to the motion axis of said controlled element, a pair of light sensitive devices adapted to detect the respective opposite edges of said light beam along said motion axis to provide fine-position signal information, means electrically energizing said light sensitive devices, and means to connect the separate outputs of said devices to the separate inputs of said input servo-amplifier.

2. The invention described in claim 1 characterized in that said light sensitive devices are mounted on said controlled element and a small, light reflecting mirror is mounted at a predetermined desired position on a fixed position reference.

3. In an electrical servo-motor control system for automatically positioning a controlled element with respect to a reference element, the combination which comprises, an input electrical servo-amplifier, an output electrical servo-amplifier, said input amplifier being connected in cascade relation with said output amplifier, a controlled element, electric motor driving means providing reverse-drive and forward-drive means for said controlled element, circuit means electrically coupling the output of said output servo-amplifier to said reverse drive means and to said forward-drive means, respectively, an electro-mechanical signal transducer adapted to provide coarse position feedback between said controlled element and the input to said output servo-amplifier, means to provide a reference command position signal to the input of said output servo-amplifier, wave-actuated supplemental means adapted to sense the position of said controlled element with respect to said reference element, said supplemental means being responsive to the movement of said controlled element throughout a predetermined restricted portion of the motion path thereof to provide fine position signal information, and means to connect the output of said wave-actuated means to the input of said input servo-amplifier.

4. Automatic electric position control apparatus adapted to operate in a system defined by cylindrical coordinates comprising, a support, a mechanical arm adjustably mounted on said support for movement in linear translation and in azimuth rotation with respect to said support, a turret rotatably mounted on said arm adjacent a free end thereof, a plurality of sets of jaws disposed about said system, means associated with each servo-motor control system to develop an output error signal corresponding to the differential existing between a command reference position signal and an actual measuring position signal, and means responsive to the presence of an error signal to arrest the advance of said program stepping switch until the error signal produced by the control system being programmed is reduced to zero.

5. Automatic electric position control apparatus adapted to operate in a system defined by cylindrical coordinates comprising, a support, a mechanical arm adjustably mounted on said support for movement in linear translation and in azimuth rotation with respect to said support, a turret rotatably mounted on said arm adjacent a free end thereof, a plurality of sets of jaws disposed about said turret, the fingers of each of said jaws being adapted to be opened and closed to grasp and release, switchable selectively variable radial reference measuring means, a first electrical servo-motor control system adapted to variably adjust by linear movement the effective radial length of said mechanical arm in accordance with a preselected setting of said radial reference measuring means, switchable selectively variable height reference measuring means, a second electrical servo-motor control system adapted to variably adjust the height of said mechanical arm above said support in accordance with a preselected setting of said height reference measuring means, switchable selectively variable azimuth-angle reference measuring means, a third electrical servo-motor control system adapted to variably adjust the azimuth-angle of said mechanical arm with respect to said support in accordance with a preselected setting of said azimuth-angle reference measuring means, reference switch measuring means, a digital control system adapted to rotate said turret and one of said sets of jaws by the shorter path from a given position to a preselected working position in accordance with a preselected setting of said reference switch measuring means, an electro-mechanical control system adapted to open and close the said fingers of said jaws in accordance with a preselected setting of said reference switch measuring means, program storing means including a plurality of selectively variable reference measuring means, one for each of said servo-motor control systems, an electrically actuated program stepping switch adapted to sequentially connect the respective reference measuring means to each corresponding control system, means associated with each servo-motor control system to develop output error signals proportional to the position and the velocity of said mechanical arm, and means responsive to the presence of an error signal to arrest the advance of said program stepping switch until the error signals produced by the control system being programmed are reduced to zero.

6. Automatic electric position control apparatus adapted to operate in a system defined by cylindrical coordinates comprising, a support, an arm adjustably mounted on said support for movement in linear translation and in azimuth rotation with respect to said support, variable radial reference measuring means adapted to provide coarse position control information, a first electrical servo-motor control system adapted to variably adjust by linear movement the effective radial length of said arm in accordance with a preselected setting of said radial reference measuring means, switchable selectively variable azimuth-angle reference measuring means adapted to provide coarse position control information, a second electrical servo-motor control system adapted to variably adjust the azimuth-angle of said arm above said support in accordance with a preselected setting of said azimuth-angle reference measuring means, means mounted on said arm adapted to project a narrowly restricted light beam having a rectangular cross section with two edges of said beam being oriented at right angles with respect to the radial motion axis, a first pair of light sensitive devices adapted to detect the respective opposite edges of said light beam which intercept the radial motion axis of said arm to provide fine-position control information for said first electrical servo-motor control system, a second pair of light sensitive devices adapted to detect the respective opposite edges of said light beam which intercept the azimuthal motion axis of said arm to provide fine-position control information for said second electrical servo-motor control system, and circuit means provided to connect the outputs of said light sensitive devices to the respective inputs of said first and second servo-motor control systems.

7. A switching system comprising in combination, a plurality of multi-position electrical switches disposed in a plane on a common control panel and adapted to be manually operated with associated switch handles, a flat punch card having a plurality of perforations therethrough one for each of said switch handles, and spaced correspondingly to the desired position to be assumed by each of said turrets, the fingers of each of said jaws being adapted to be opened and closed to grasp and release, switchable selectively variable radial reference measuring means, a first electrical servo-motor control system adapted to variably adjust by linear movement the effective radial length of said mechanical arm in accordance with a preselected setting of said radial reference measuring means, switchable selectively variable height reference measuring means, a second electrical servo-motor control system adapted to variably adjust the height of said mechanical arm above said support in accordance with a preselected setting of said height reference measuring means, switchable selectively variable azimuth-angle reference measuring means, a third electrical servo-motor control system adapted to variably adjust the azimuth-angle of said mechanical arm with respect to said support in accordance with a preselected setting of said azimuth-angle reference measuring means, reference switch measuring means, a digital control system adapted to rotate said turret and one of said sets of jaws by the shorter path from a given position to a preselected working position in accordance with a preselected setting of said reference switch measuring means, an electromechanical control system adapted to open and close the said fingers of said jaws in accordance with a preselected setting of said reference switch measuring means, program storing means including a plurality of selectively variable reference measuring means, one for each of said servo-motor control systems, an electrically actuated program stepping switch adapted to sequentially connect the respective reference measuring means to each corresponding control switches, said punch card being adapted to overlay said switch handles and to prevent movement thereof when said handles are positioned to effect a predetermined switching program.

8. In an electrical servo-motor control system for automatically positioning a controlled element with respect to a reference element, the combination which comprises, an input electrical servo-amplifier, an output electrical servo-amplifier, said input amplifier being connected in cascade relation with said output amplifier, a controlled element, electric motor driving means providing reverse-drive and forward-drive means for said controlled element, circuit means electrically coupling the output of said output servo-amplifier to said reverse-drive means and to said forward-drive means, respectively, an electromechanical signal transducer adapted to provide coarse position feedback between said controlled element and the input to said output servo-amplifier, means to provide a reference command position signal to the input of said output servo-amplifier, means mounted on said controlled element for producing a narrowly restricted light beam having a symmetrical cross-section with respect to the motion axis of said controlled element, a pair of light sensitive devices adapted to detect the respective opposite edges of said light beam along said motion axis to provide fine position signal information, means for electrically energizing the said light sensitive devices, and means to connect the output of said light sensitive devices to the input of said input servo-amplifier.

9. In an electrical servo-motor control system for automatically positioning a controlled element, the combination which comprises, a balanced input electrical servo-amplifier, a balanced output electrical servo-amplifier, said input amplifier being connected in cascade relation with said output amplifier, a controlled element, electric motor driving means, reverse-drive and forward-drive magnetic clutches, said motor driving means being differentially coupled mechanically to said controlled element by said magnetic clutches respectively, circuit means electrically coupling the separate outputs of said output servo-amplifier to said reverse-drive and to said forward-drive magnetic clutches respectively, an electro-mechanical signal transducer adapted to provide coarse position feedback between said controlled element and a first input to said output servo-amplifier, means to provide a variable amplitude reference command position signal to a second input of said output servo-amplifier, means mounted on said controlled element for producing a narrowly restricted light beam having a symmetrical cross-section with respect to the motion axis of said controlled element, a pair of light sensitive devices adapted to detect the respective opposite edges of said light beam along a predetermined restricted portion of said motion axis to provide fine-position signal information, means electrically energizing said light sensitive devices, and means to connect the separate outputs of said devices to the separate inputs of said input servo-amplifier.

10. Automatic electric position control apparatus adapted to operate in a system defined by cylindrical coordinates comprising, a support, a mechanical arm adjustably mounted on said support for movement in linear translation and in azimuth rotation with respect to said support, a set of jaws operably mounted on said arm adjacent a free end thereof, the fingers of said jaws being adapted to be opened and closed to grasp and release, switchable selectively variable radial reference measuring means, a first electrical servo-motor control system adapted to variably adjust by linear movement the effective radial length of said mechanical arm in accordance with a preselected setting of said radial reference measuring means, switchable selectively variable height reference measuring means, a second electrical servo-motor control system adapted to variably adjust the height of said mechanical arm above said support in accordance with a preselected setting of said height reference measuring means, switchable selectively variable azimuth-angle reference measuring means, a third electrical servo-motor control system adapted to variably adjust the azimuth-angle of said mechanical arm with respect to said support in accordance with a preselected setting of said azimuth-angle reference measuring means, switchable reference switch measuring means, an electro-mechanical control system provided to open and close the said fingers of said jaws in accordance with a preselected setting of said reference switch measuring means, program storing means including a separate plurality of selectively variable reference measuring means for each of the said servo-motor control systems along with a plurality of reference switch measuring means for said electro-mechanical control system, an electrically actuated program stepping switch adapted to sequentially connect the respective reference measuring means in said program storing means to each corresponding control system, means associated with each servo-motor control system to develop an output error signal corresponding to the differential existing between a command reference position signal and an actual measuring position signal, and means responsive to the presence of an error signal to arrest the advance of said program stepping switch until the error signal produced by the control system being programmed is reduced to zero.

11. Automatic electric position control apparatus adapted to operate in a system defined by cylindrical coordinates comprising, a support, a mechanical arm adjustably mounted on said support for movement in linear translation and in azimuth rotation with respect to said support, a turret rotatably mounted on said arm adjacent a free end thereof, a plurality of sets of jaws disposed about said turret, the fingers of each of said jaws being adapted to be opened and closed to grasp and release, switchable selectively variable radial reference measuring means, a first electrical servo-motor control system adapted to variably adjust by linear movement the effective radial length of said mechanical arm in accordance with a preselected setting of said radial reference measuring means, switchable selectively variable height reference measuring means, a second electrical servo-motor control system adapted to variably adjust the height of said mechanical arm above said support in accordance with a preselected setting of said height reference measuring means, switchable selectively variable azimuth-angle reference measuring means, a third electrical servo-motor control system adapted to variably adjust the azimuth-angle of said mechanical arm with respect to said support in accordance with a preselected setting of said azimuth-angle reference measuring means, reference switch measuring means, a digital control system adapted to rotate said turret and one of said sets of jaws from a given position to a preselected working position in accordance with a preselected setting of said reference switch measuring means, an electro-mechanical control system adapted to open and close the said fingers of said jaws in accordance with a preselected setting of said reference switch measuring means, program storing means including a plurality of selectively variable reference measuring means, one for each of said servo-motor control systems, an electrically actuated program stepping switch adapted to sequentially connect the respective reference measuring means to each corresponding control system, means associated with each servo-motor control system to develop an output error signal corresponding to the differential existing between a command reference position signal and an actual measuring position signal, and means responsive to the presence of an error signal to arrest the advance of said program stepping switch until the error signal produced by the control system being programmed is reduced to zero.

References Cited in the file of this patent

UNITED STATES PATENTS

| | | |
|---|---|---|
| 2,425,733 | Gille et al. | Aug. 19, 1947 |
| 2,506,798 | Lillja | May 9, 1950 |
| 2,847,867 | Shepard | Aug. 19, 1958 |

UNITED STATES PATENT OFFICE
CERTIFICATION OF CORRECTION

Patent No. 3,007,097                                    October 31, 1961

Edwin F. Shelley et al.

It is hereby certified that error appears in the above numbered patent requiring correction and that the said Letters Patent should read as corrected below.

Column 3, lines 39 and 40, for "extenal" read -- external --; column 13, line 54, after "said" insert -- turret, the fingers of each of said jaws being adapted to be opened and closed to grasp and release, switchable selectively variable radial reference measuring means, a first electrical servo-motor control system adapted to variably adjust by linear movement the effective radial length of said mechanical arm in accordance with a pre-selected setting of said radial reference measuring means, switchable selectively variable height reference measuring means, a second electrical servo-motor control system adapted to variably adjust the height of said mechanical arm above said support in accordance with a preselected setting of said height reference measuring means, switchable selectively variable azimuth-angle reference measuring means, a third electrical servo-motor control system adapted to variably adjust the azimuth-angle of said mechanical arm with respect to said support in accordance with a preselected setting of said azimuth-angle reference measuring means, reference switch measuring means, a digital control system adapted to rotate said turret and one of said sets of jaws by the shorter path from a given position to a preselected working position in accordance with a preselected setting of said reference switch measuring means, an electro-mechanical control system adapted to open and close the said fingers of said jaws in accordance with a pre-selected setting of said reference switch measuring means, program storing means including a plurality of selectively variable reference measuring means, one for each of said servo-motor control systems, an electrically actuated program stepping switch adapted to sequentially connect the respective reference measuring means to each corresponding control --; column 14, line 73, beginning with "turrets, the" strike out all to and including "corresponding control" in lines 28 and 29, column 15; column 17, lines 6 and 7, for "meansuring" read -- measuring --.

Signed and sealed this 5th day of June 1962.

(SEAL)
Attest:

ERNEST W. SWIDER                                    DAVID L. LADD
Attesting Officer                                       Commissioner of Patents